United States Patent
Peretz (10) Patent No.: US 11,656,725 B2
(45) Date of Patent: May 23, 2023

(54) TOUCH-SENSING ELECTRODE DRIVING FOR DISPLAY DEVICE

(71) Applicant: Microsoft Technology Licensing, LLC, Redmond, WA (US)

(72) Inventor: Ahia Peretz, Elkana (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/446,589

(22) Filed: Aug. 31, 2021

(65) Prior Publication Data

US 2023/0061297 A1    Mar. 2, 2023

(51) Int. Cl.
  *G06F 3/044* (2006.01)

(52) U.S. Cl.
  CPC .......... *G06F 3/0441* (2019.05); *G06F 3/0443* (2019.05); *G06F 2203/04114* (2019.05)

(58) Field of Classification Search
  CPC ................. G06F 3/0441; G06F 3/0443; G06F 2203/04114
  See application file for complete search history.

(56) References Cited

U.S. PATENT DOCUMENTS

| | | | |
|---|---|---|---|
| 10,191,586 B2 | 1/2019 | Kida et al. | |
| 10,234,965 B2 | 3/2019 | Qiao | |
| 10,768,719 B2 | 9/2020 | Ju et al. | |
| 2016/0062519 A1* | 3/2016 | Park | G06F 3/0446 345/173 |
| 2016/0266673 A1 | 9/2016 | Dinu et al. | |
| 2018/0217686 A1 | 8/2018 | Qiao | |
| 2019/0146602 A1 | 5/2019 | Kadowaki et al. | |
| 2019/0171320 A1 | 6/2019 | Kim et al. | |
| 2020/0183521 A1 | 6/2020 | Mayumi et al. | |

FOREIGN PATENT DOCUMENTS

| | | |
|---|---|---|
| EP | 3182259 A1 | 6/2017 |
| EP | 2972695 B1 | 1/2020 |
| EP | 2998834 B1 | 1/2020 |

OTHER PUBLICATIONS

"International Search Report and Written Opinion Issued in PCT Application No. PCT/US22/037098", dated Oct. 28, 2022, 13 Pages.

* cited by examiner

*Primary Examiner* — Amit Chatly
(74) *Attorney, Agent, or Firm* — Alleman Hall Creasman & Tuttle LLP (57) ABSTRACT

A method for a touch-sensitive display device comprises detecting a position of a stylus touch input relative to a plurality of touch-sensing electrodes, the stylus touch input corresponding to proximity of an active stylus to a display surface. A position of a human hand touch input is detected, corresponding to proximity of a human hand to the display surface. Each of the plurality of touch-sensing electrodes are driven with a first drive signal to communicate data to the active stylus. An electrical grounding condition is detected that interferes with reception of the first drive signal by the active stylus. A hand-proximity-subset of the plurality of touch-sensing electrodes within a threshold distance of the position of the human hand touch input are driven with a second drive signal, different from the first drive signal.

11 Claims, 7 Drawing Sheets

TOUCH-SENSING ELECTRODE DRIVING FOR DISPLAY DEVICE

BACKGROUND

A touch-sensitive display device may include a plurality of touch-sensing electrodes configured to respond to proximity of an input object, such as a stylus or human finger. In some cases, the touch-sensing electrodes may be driven with an electrical drive signal that encodes data to be communicated to an active stylus or other separate electronic device.

DETAILED DESCRIPTION

A touch-sensitive display device may sometimes communicate data to a separate active stylus (and/or other suitable electronic device) electrostatically—e.g., by driving touch-sensing electrodes of the display device with a drive signal that encodes the data to be communicated. For instance, the drive signal applied to the touch-sensing electrodes may influence electrical conditions at a nearby electrode within the active stylus. Logic components within the active stylus may detect the changing electrical conditions at the stylus electrode, and thereby decode the data communicated by the touch-sensitive display device. This may be referred to as an "uplink" signal, while a "downlink" signal may communicate information from the stylus to the display device in a similar manner. While the present disclosure primarily focuses on electrostatic communication, it will be understood that the display device and active stylus may additionally exchange data over other communications channels—e.g., via a radiofrequency protocol such as Bluetooth.

In any case, the data exchanged may, as non-limiting examples, enable the touch-sensitive display device and active stylus to achieve a shared sense of time, establish which frequencies will be used for future communication, communicate user preferences data (e.g., a designated "ink" color), exchange device identifiers, button-press indications, a measured pressure of the stylus tip against the display surface, an estimated distance of the stylus tip away from the display surface, an estimated speed of the active stylus across the display surface (e.g., for purposes of simulating different amounts of friction on the display surface), etc. It will be understood that the techniques described herein may be implemented for any electrostatic communication of computer data from a touch-sensitive display device to an active stylus, regardless of the purpose of the communication or the specific form that the data takes.

However, depending on how the touch-sensitive display device and/or active stylus are electrically grounded, certain grounding conditions can interfere with reception of the drive signal at the active stylus. This can sometimes occur when, for example, the touch-sensitive display device is not grounded to earth ground via a power supply (e.g., the device is running on battery power), the touch-sensitive display device is resting on a relatively non-conductive surface (e.g., not being held by a human user), and/or the human user is only contacting the touch-sensitive display device with the same hand being used to hold the active stylus. In such cases, capacitance between the touch-sensing electrodes and human hand, and capacitance between the human hand and active stylus, may cause injection of the drive signal into the electrical ground of the active stylus by way of the human hand contacting the display surface. This may interfere with reception of the same drive signal at the stylus electrode—e.g., by reducing the amount of the first drive signal that flows into the stylus tip from the touch-sensing electrodes.

Notably, as used herein, the electrical grounding condition interferes with "reception" of the drive signal at the active stylus any time the grounding condition affects the ability of the active stylus to interpret the drive signal in a useable way. Thus, even in scenarios where the drive signal is received at the stylus electrode, the grounding condition may still interfere with "reception" of the drive signal when the grounding condition causes electrical interference that makes it more difficult for the active stylus to decode and interpret the drive signal. For instance, when the drive signal is also entering the electrical ground of the stylus by way of the human hand holding the stylus, the amount of the first drive signal that flows into the stylus tip may be reduced. Additionally, or alternatively, the drive signals entering the stylus from different sources may substantially cancel one another out within the internal circuitry of the active stylus. This can reduce the amount of the drive signal that is ultimately received by logic elements within the active stylus, thereby negatively affecting the ability of the active stylus to interpret and/or respond to the data communicated by the drive signal.

Accordingly, the present disclosure is directed to techniques for selectively driving touch-sensing electrodes of a touch-sensitive display with different drive signals, in a manner that can improve communication of data from the display device to a separate active stylus even in non-ideal electrical grounding scenarios. For example, the touch-sensitive display device may drive a plurality of touch-sensing electrodes with a first drive signal to communicate data to the active stylus. Upon detecting an electrical grounding condition that interferes with such communication, the touch-sensitive display device may continue driving some electrodes with the first drive signal (e.g., electrodes in relatively close proximity to the stylus), while driving other electrodes with a second, different drive signal (e.g., electrodes in relatively close proximity to the touch position of a human hand). For example, the second drive signal may have an opposite phase from the first drive signal. Selectively driving different touch-sensing electrodes with different (e.g., opposite) drive signals in this manner may improve reception of the first drive signal at the active stylus, thereby improving communication between the display device and active stylus. This may further beneficially conserve electrical power of the touch-sensitive display device—e.g., by only driving touch-sensing electrodes that are currently useful for communicating with the active stylus, rather than all touch-sensing electrodes at once.

Notably, the present disclosure primarily focuses on electrostatic communication between a touch-sensitive display device and an active stylus. However, it will be understood that the techniques described herein can be applied to electrostatic communication between a touch-sensitive display device and any suitable separate electronic device. As another non-limiting example, the techniques described herein may be applied to a dial control mechanism configured to electrostatically communicate with a touch-sensitive display device.

Figure 1:
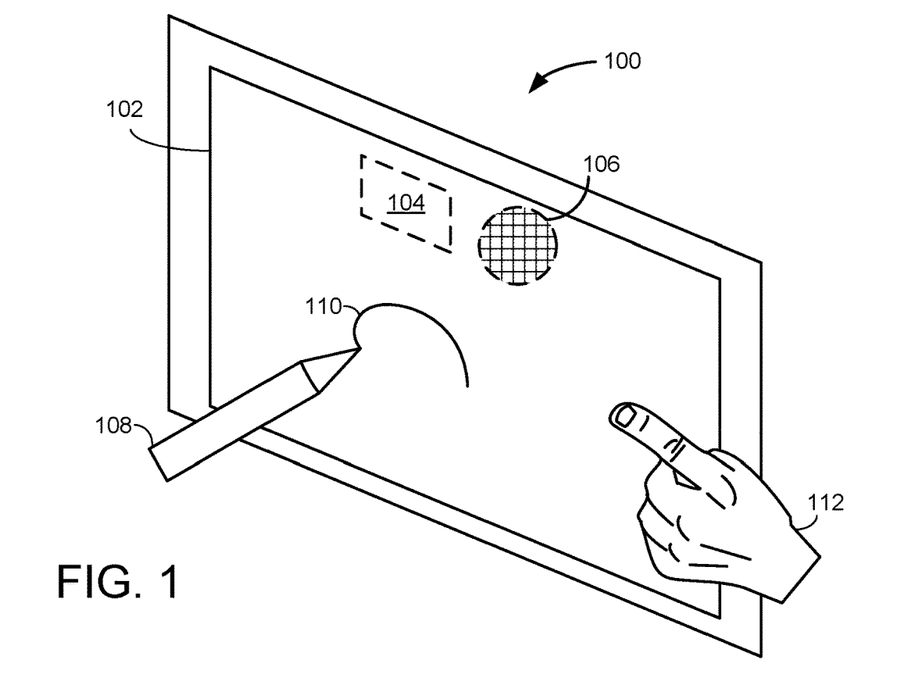
FIG. 1 schematically shows an example touch-sensitive display device.

FIG. 1 schematically shows an example touch-sensitive display device 100, including a touch-sensitive display 102. Both the touch-sensitive display device 100 and touch-sensitive display 102 may have any suitable sizes and dimensions. In some examples, a touch-sensitive display device may include more than one touch-sensitive display. For example, a touch-sensitive display device as described herein may refer to a device having two or more touch-sensitive displays in a foldable or static configuration, as well as single-display devices such as touch-sensitive display device 100. As non-limiting examples, a touch-sensitive display device may be implemented as, or be used in tandem with, a laptop computer, smartphone, tablet, computer monitor, fitness device (e.g., smartwatch), media center device, automotive computing device, etc. In some cases, a "touch-sensitive display device" as described herein may be implemented as computing system 800 described below with respect to FIG. 8.

It will be understood that the devices and components depicted in FIG. 1 are simplified and schematic in nature. In practical examples, "touch-sensitive display devices" may include additional or alternative components to those described herein; may have any suitable shapes, sizes, and form factors; and may have any suitable capabilities.

Touch-sensitive display device 100 includes a controller 104 configured to perform one or more of the computing functions described herein. For example, as will be described in more detail below, controller 104 may be configured to detect positions of touch inputs relative to a display surface of the touch-sensitive display, and drive touch-sensing electrodes with various drive signals—e.g., to communicate data to a separate active stylus or other electronic device. In some examples, the controller may include one or more computer processors, or other suitable logic hardware, working in tandem with one or more volatile or non-volatile data storage devices, or other suitable storage hardware. In some examples, controller 104 may be implemented via logic subsystem 802 and storage subsystem 804 described below with respect to FIG. 8.

Touch-sensitive display 102 includes a plurality of touch-sensing electrodes, including electrodes 106, which may be configured to detect proximity of input objects to the touch-sensitive display. Input objects may include, as examples, human fingers, passive styluses, active styluses, and other suitable electronic devices or non-electronic objects. The touch-sensing electrodes may detect proximity of an input object in various different ways depending on the implementation. In general, proximity of an input object to the display surface (e.g., directly contacting the display surface, or hovering above the display surface) may affect electrical conditions at the touch-sensing electrodes in a measurable way. By monitoring electrical conditions at the plurality of touch-sensing electrodes, controller 104 may determine the two-dimensional position of the touch input relative to the surface of the display. Touch-sensing electrodes 106 and controller 104 are shown with dashed lines to indicate that they are disposed beneath the display surface and would not ordinarily be visible from the illustrated perspective.

In FIG. 1, a stylus 108 is in proximity to the surface of touch-sensitive display 102. The stylus may, for example, take the form of an active stylus that includes an internal power supply and internal logic components configured to transmit electrical signals that are detectable by the touch-sensitive display device. Proximity of the active stylus to the surface of the touch-sensitive display is detected by the display device as a touch input, resolvable to a particular location relative to the display surface. This location may be provided to an operating system and/or one or more software applications of the touch-sensitive display device as an input that controls or changes behavior of the display device. It will be understood that "proximity" of an active stylus to a display surface may include either or both of direct contact between the stylus and display surface, and "hovering" of the stylus at a position near (e.g., within several centimeters of) the display surface.

In the example of FIG. 1, the stylus includes a pointed tip that is making contact with the surface of the touch-sensitive display. For example, the stylus tip may include an internal conductive electrode that is configured to electrostatically interact with touch-sensing electrodes of the display device. It will be understood, however, that stylus 108 is non-limiting, and that the techniques described herein may be applied to styluses (and/or other suitable electronic devices) having any suitable configurations and structures. For example, each end of the active stylus may have any suitable shape (e.g., pointed, rounded, flat, wedge-shaped), and the active stylus may include any number of different electrodes having any suitable positions within the body of the active stylus.

In FIG. 1, the touch-sensitive display device is graphically rendering the touch input as a line 110 that reflects detected movements of the active stylus relative to the display surface over time. It will be understood that line 110 is only included for the sake of illustration, and that a touch-sensitive display device as described herein need not graphically render detected touch inputs.

FIG. 1 also shows a human hand 112 in proximity to the surface of the touch-sensitive display. As discussed above, the touch-sensing electrodes of the touch-sensing display may be affected by proximity of any variety of different types of input objects to the display surface. In some cases, different types of input objects may be distinguished from one another based on the manner in which they influence electrical conditions at the touch-sensing electrodes. For example, some types of input objects (such as human hands and passive stylus) may passively influence capacitance at the touch-sensing electrodes, while other types of input objects (e.g., active styluses) may actively transmit signals that enable them to be uniquely distinguished from other input objects. Thus, for instance, touch-sensitive display device may be configured to differentiate between active stylus 108 and human hand 112, and respond to touch inputs provided by these input objects in different ways.

As discussed above, in the case of active styluses (and/or other suitable electronic devices), the touch-sensitive display device may in some cases communicate with the active stylus electrostatically by driving the touch-sensing electrodes with a drive signal that encodes the data to be communicated. This is schematically illustrated with respect to FIG. 2. Specifically, FIG. 2 again shows touch-sensitive display device 100, but this time as a cross-section that shows active stylus 108 spaced away from touch-sensitive display 102, and touch-sensing electrodes 106 disposed beneath the display surface. As with FIG. 1, it will be understood that the specific arrangement of components shown in FIG. 2 (as well as other figures described herein) is non-limiting, highly simplified, and schematic in nature. In general, a touch-sensitive display device may have additional or alternative components to those described herein, and such components may be arranged in any suitable configuration.

Figure 2:
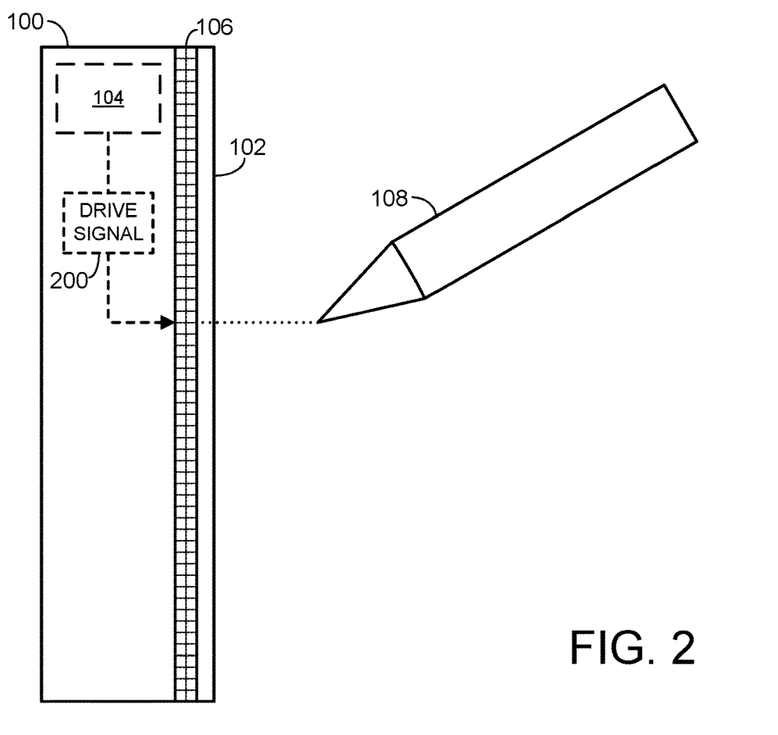
FIG. 2 schematically illustrates driving of a plurality of touch-sensing electrodes with a drive signal.

In FIG. 2, the tip of active stylus 108 is shown as being spaced away from the surface of touch-sensitive display 102. However, this is primarily done for the sake of visual clarity. As discussed above, the touch-sensitive display device may detect a touch input based on proximity of an input object to the display surface, where "proximity" can refer to scenarios where the input object is spaced away from the display surface, and/or scenarios where the input object is directly contacting the display surface.

In FIG. 2, controller 104 is driving touch-sensing electrodes 106 with a drive signal 200, which encodes computer data to be communicated to the active stylus. As discussed above, by driving the touch-sensing electrodes with the drive signal, the touch-sensitive display device may influence electrical conditions in a manner that is detectable by active stylus 108—e.g., enabling the active stylus to receive and decode the computer data encoded by the drive signal. This is illustrated in FIG. 2 by the dotted line extending away from touch-sensing electrodes 106 toward active stylus 108, representing how the drive signal applied to the touch-sensing electrodes may be detected and received by the nearby active stylus.

However, as discussed above, certain electrical grounding conditions affecting either or both of the touch-sensitive display device and the active stylus can interfere with reception of the drive signal by the active stylus. This, in turn, interferes with communication of data (e.g., an uplink signal) from the display device to the stylus, which can have a negative effect on user experience.

Figure 3:
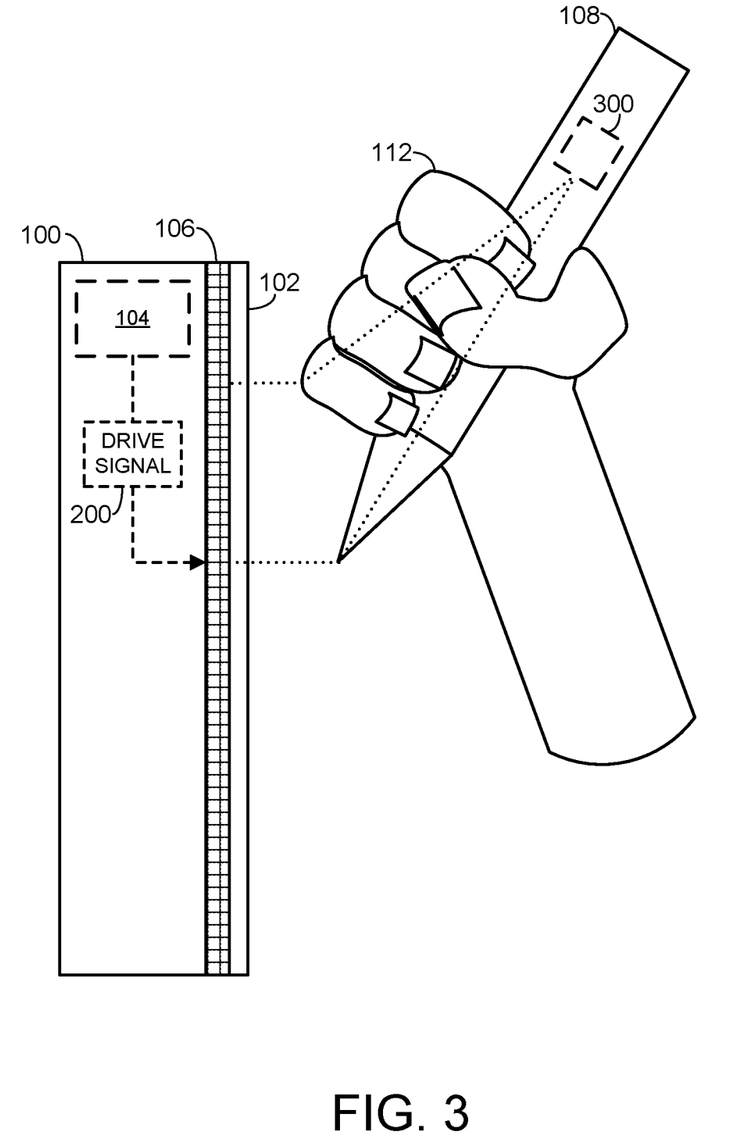
FIG. 3 schematically depicts an electrical grounding condition affecting reception of a drive signal at an example active stylus.

One example scenario is schematically illustrated with respect to FIG. 3. Specifically, FIG. 3 again shows active stylus 108 in proximity to touch-sensitive display 102 while touch-sensing electrodes 106 are driven with drive signal 200. The drive signal is detected and received at an electrode disposed within active stylus (e.g., within the pointed stylus tip). However, in the example of FIG. 3, an electrical grounding condition is negatively affecting reception of the drive signal by the stylus electrode. For example, as discussed above, this may occur when the touch-sensitive display device is not grounded to earth ground (e.g., running on battery power rather than plugged into a grounded power supply), resting on a relatively non-conductive surface (e.g., rather than being held by the human user), and/or the only part of the user's body that is in proximity to the display surface is the same hand that is holding the active stylus (e.g., human hand 112).

In such a scenario, capacitance between the touch-sensing electrodes and human hand, as well as capacitance between the human hand and an electrical ground 300 of the active stylus, may cause the drive signal to enter the electrical ground of the stylus by way of the human hand. Notably, this may occur at the same time as the drive signal is influencing electrical conditions at the stylus electrode. In other words, the same drive signal may enter the active stylus in two different ways—e.g., the drive signal may enter the stylus electrode directly from the touch-sensing electrodes, and the drive signal may enter the stylus ground by way of the human hand holding the stylus. This is illustrated in FIG. 3 by the dotted lines extending away from the touch-sensing electrodes toward the stylus tip and human hand, converging at electrical ground 300 of the active stylus. This condition may generate electrical interference within the internal circuitry of the active stylus, thereby affecting reception of the drive signal at the active stylus and constituting an "electrical grounding condition" as described herein. For example, the drive signal entering the stylus ground may reduce the potential for current to flow into the stylus tip, and/or drive signals entering the stylus from different sources may substantially cancel one another out, reducing the amount of useable signal reaching logic elements within the active stylus.

It will be understood that the above description of electrical grounding conditions is only one non-limiting example. It will be understood that the techniques described herein can be applied in a variety of different scenarios where the manner in which a touch-sensitive display device and/or separate active stylus are grounded interferes with reception of a drive signal by the active stylus.

Figure 4:
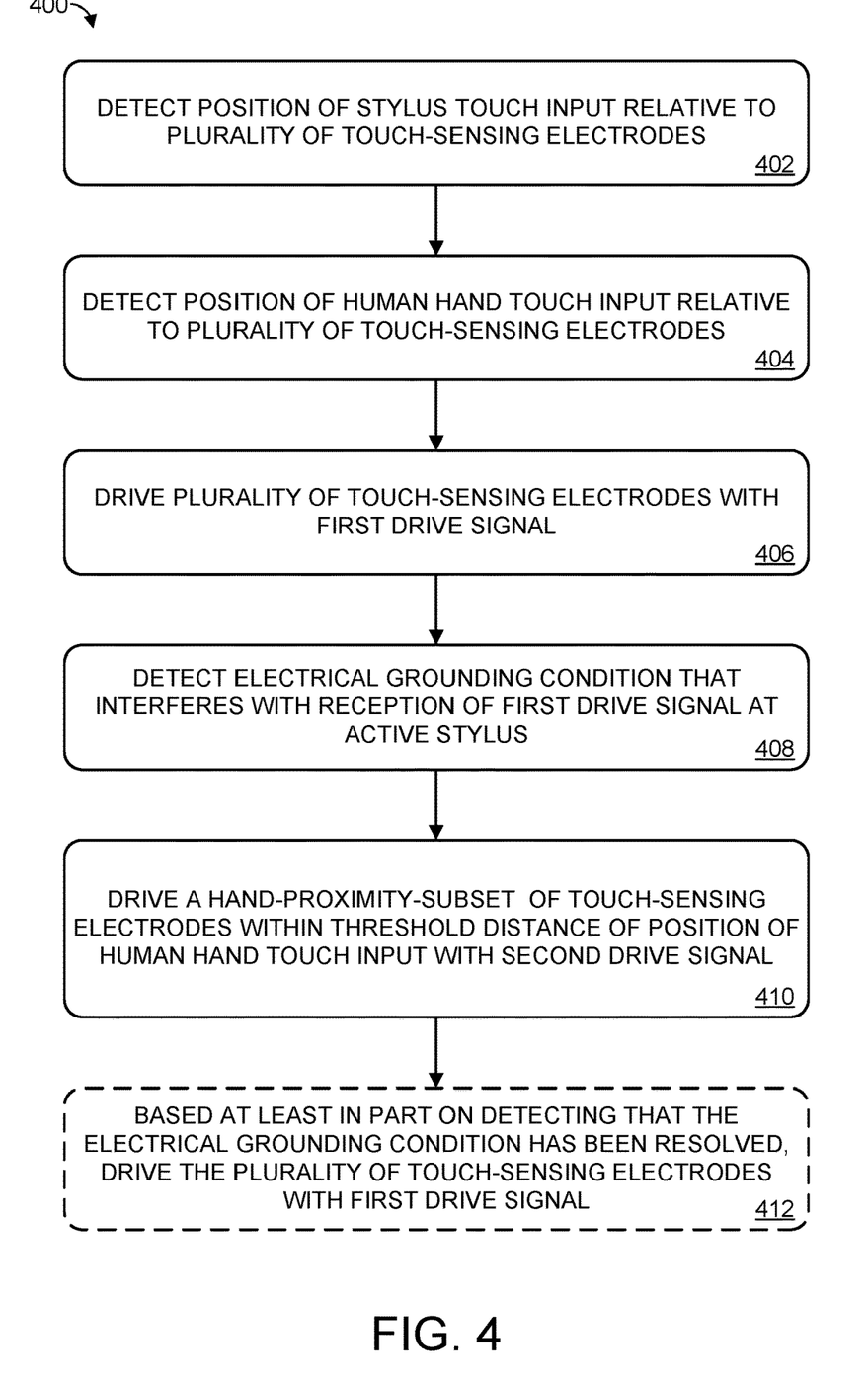
FIG. 4 illustrates an example method for a touch-sensitive display device.

FIG. 4 illustrates an example method 400 for a touch-sensitive display device that may mitigate electrostatic communication issues relating to electrical grounding conditions described above. Method 400 may be implemented by any suitable computing system of one or more computing devices, and any computing devices implementing method 400 may each have any suitable capabilities, form factors, and hardware configurations. As one example, method 400 may be implemented by touch-sensitive display device 100—e.g., steps of method 400 may be performed by controller 104. In some cases, method 400 may be implemented by computing system 800 described below with respect to FIG. 8.

At 402, method 400 includes detecting a position of a stylus touch input relative to a plurality of touch-sensing electrodes of the touch-sensitive display device. As discussed above, the stylus touch input corresponds to proximity of an active stylus to a surface of a touch-sensitive display of the touch-sensitive display device.

Furthermore, at 404, method 400 includes detecting a position of a human hand touch input relative to the plurality of touch-sensing electrodes, where the human hand touch input corresponds to proximity of a human hand to the display surface. For instance, as described above, proximity of the human hand to the display surface may influence electrical conditions (e.g., change capacitance) measured at one or more of the touch-sensing electrodes.

Figure 5:
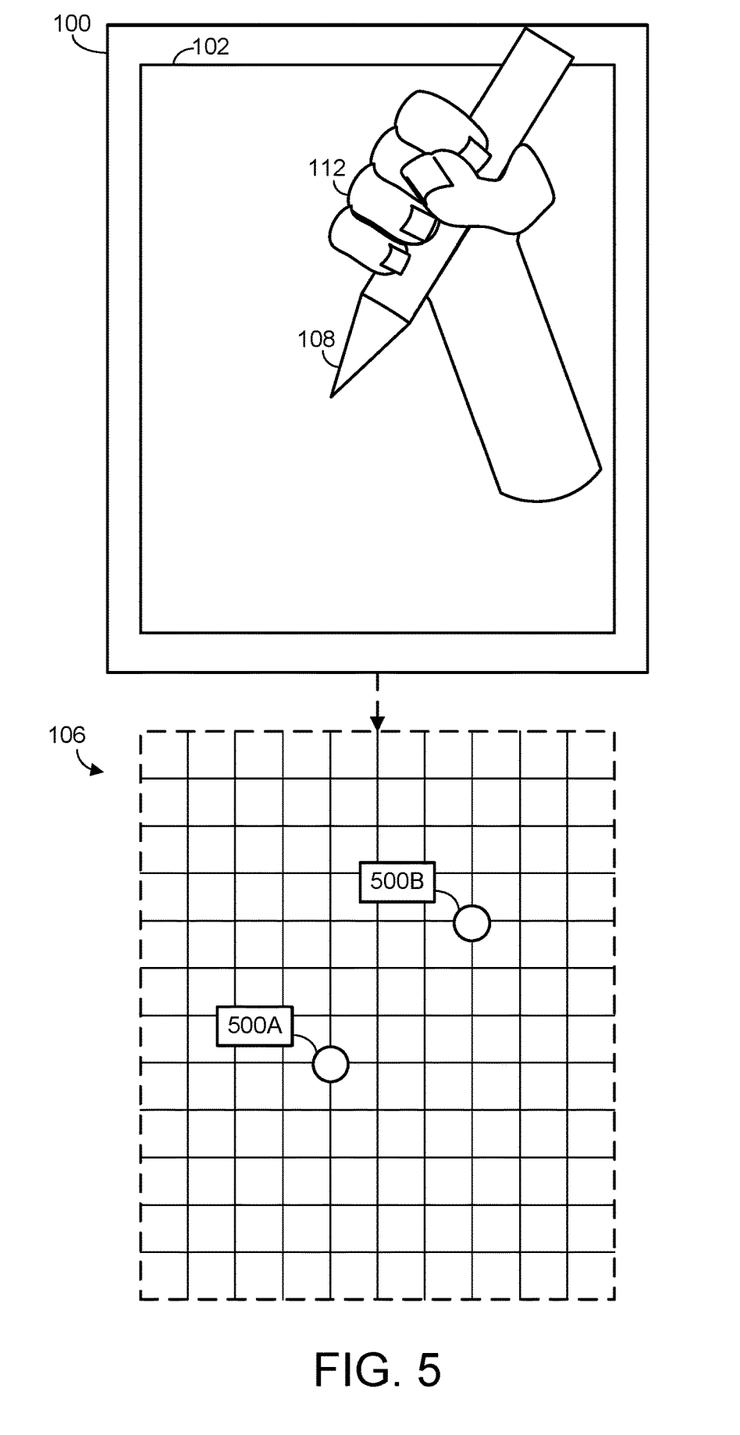
FIG. 5 schematically illustrates detecting positions of a stylus touch input and a human hand touch input relative to a plurality of touch-sensing electrodes.

This is schematically illustrated with respect to FIG. 5, again showing touch-sensitive display device 100. In the example of FIG. 5, active stylus 108 is being held by human hand 112, and both are in proximity to the surface of touch-sensitive display 102. FIG. 5 also shows a schematic representation of the plurality of touch-sensing electrodes 106. The touch-sensitive display device detects the proximity of the active stylus and human hand, and resolves the positions of these input objects to a stylus touch input 500A and a human hand touch input 500B, shown relative to the plurality of touch-sensing electrodes. Notably, in the example of FIG. 5, the positions of the stylus touch input and human hand touch input are represented as small circles. However, it will be understood that, in practical examples, the collections of individual touch-sensing electrodes that detect these touch inputs may take any suitable shape, including irregular shapes. For example, the portion of a human hand contacting the display surface may form an irregular "blob" shape.

The positions of the stylus touch input and human hand touch input may be determined in any suitable way, depending on the specific type of technology used to implement touch-sensing at the touch-sensitive display device. For example, the touch-sensitive display may be a capacitive display panel—e.g., including a grid of conductive traces that exhibit a measurable change in capacitance based on proximity of a conductive object to the display surface. As non-limiting examples, the touch-sensitive display device may utilize one or both of self-capacitance and mutual-capacitance touch-sensing technologies. In some cases, the touch-sensing electrodes may be implemented using an "in-cell" configuration, and/or an "on-cell" configuration. In any case, controller 104 of the touch-sensitive display device may detect changes in capacitance at touch-sensing electrodes localized to a particular area relative to the touch-sensitive display, and thereby determine the position of a touch input corresponding to proximity of an input object that caused the change in capacitance.

Figure 6A:
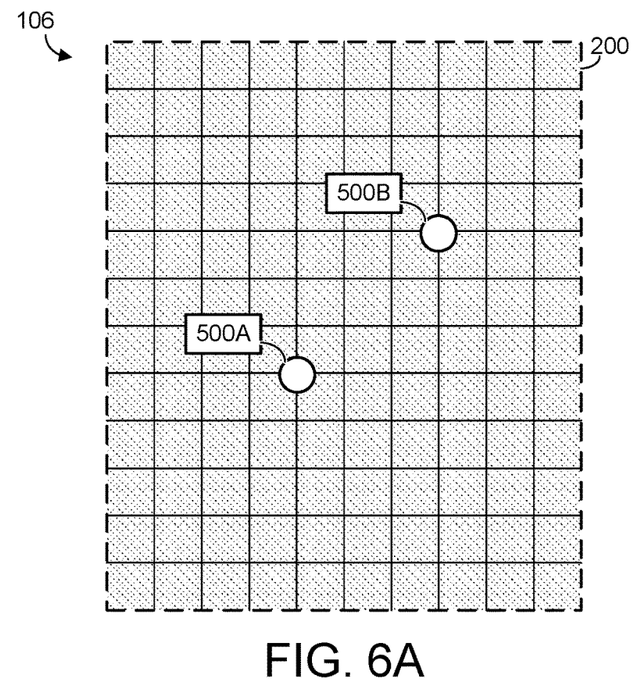
FIGS. 6A and 6B schematically illustrate detecting an electrical grounding condition at a touch-sensitive display device.

Returning to FIG. 4, at 406, method 400 includes driving each of the plurality of touch-sensing electrodes with a first drive signal to communicate data to the active stylus. This is schematically illustrated with respect to FIG. 6A. Specifically, FIG. 6A again shows a schematic representation of the plurality of touch-sensing electrodes 106, and shows the determined positions of the stylus touch input 500A and human hand touch input 500B. In FIG. 6A, the touch-sensing electrodes are shown with a fill pattern to indicate that controller 104 is driving the touch-sensing electrodes with the first drive signal 200—e.g., to communicate computer data to the active stylus.

In FIG. 6A, the plurality of touch-sensing electrodes driven with the first drive signal includes all touch-sensing electrodes of the touch-sensitive display device. It will be understood, however, that this is not limiting. Rather, in other examples, the plurality of touch-sensing electrodes driven with the first drive signal need not include all touch-sensing electrodes of the touch-sensitive display. For instance, the touch-sensitive display device may selectively drive touch-sensing electrodes that are relatively close to the position of the stylus touch input. This may achieve electrical power savings even when the electrical grounding condition is not detected—e.g., by only using power to drive electrodes near the position of the active stylus. In general, for the purposes of the present disclosure, a "plurality" of touch-sensing electrodes may refer to all electrodes of the touch-sensing display, or less than all electrodes of the touch-sensing display.

Returning to FIG. 4, at 408, method 400 includes detecting an electrical grounding condition that interferes with reception of the first drive signal by the active stylus. As discussed above, such an electrical grounding condition may occur when, for example, the first drive signal is injected into the electrical ground of the active stylus via the human hand holding the stylus. The electrical grounding condition may be detected in various suitable ways, depending on the implementation and the specific factors contributing to the electrical grounding condition.

For example, in some cases, the electrical grounding condition may be detected based at least in part on receiving, from the active stylus, an indication of insufficient reception of the first drive signal. This is schematically illustrated with respect to FIG. 6B. Specifically, FIG. 6B again shows touch-sensitive display device 100 as the plurality of touch-sensing electrodes are driven with drive signal 200. As shown, the electrical grounding condition is again interfering with reception of the drive signal by the active stylus. Thus, the active stylus transmits to the touch-sensitive display device an indication 600 of insufficient reception of the first drive signal.

Figure 6B:
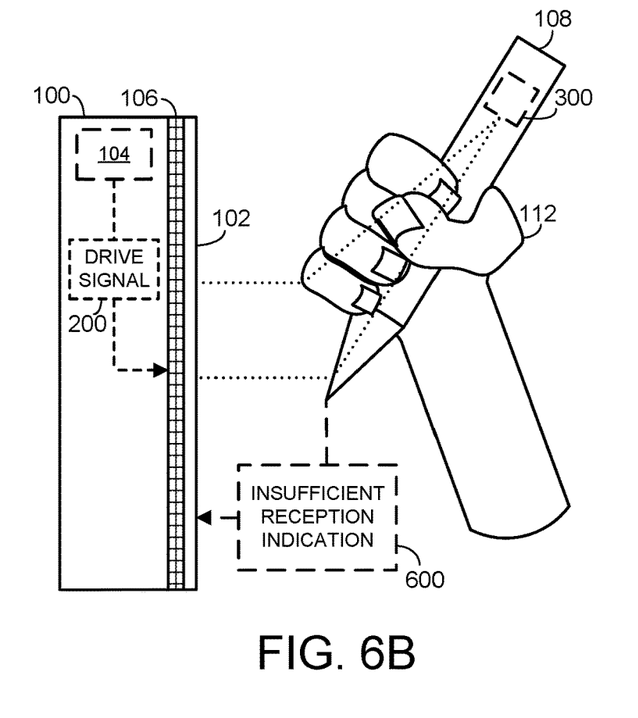

Indication 600 may be communicated to the touch-sensitive display device by the active stylus in any suitable way. As one example, indication 600 may be communicated electrostatically—e.g., via a downlink signal transmitted by an electrode in the stylus tip. As another example, indication 600 may be communicated using another suitable communications protocol—e.g., via a radiofrequency communications channel such as Bluetooth. Furthermore, indication 600 may take the form of computer data using any suitable formatting or schema that can be interpreted by the touch-sensitive display device.

The active stylus may generate indication 600 at any suitable time and for any suitable reason. In general, the active stylus may expect to receive the drive signal from the touch-sensitive display device with at least a certain minimum signal strength in order for the signal to be reliably decoded and interpreted. If the signal strength of the received drive signal at the active stylus drops to below the minimum signal strength—e.g., due to a change in the electrical grounding conditions of one or both of the touch-sensitive display device and active stylus—then the active stylus may generate and transmit indication 600 to the touch-sensitive display device. It will be understood that the specific minimum signal strength expected by the active stylus will vary from one implementation to another depending on the specific hardware included in the touch-sensitive display device and active stylus.

As another non-limiting example, the touch-sensitive display device may detect the electrical grounding condition based on an analysis of signals measured at the touch-sensing electrodes. For example, as discussed above, proximity of an input object to the touch-sensitive display may cause a measurable change in capacitance at the plurality of touch-sensing electrodes. This change in capacitance can be localized to a particular position relative to the surface of the display, corresponding to the position of the touch input. In the case of a touch sensor that uses mutual capacitance, proximity of an input object (such as a human hand) causes a measured reduction in capacitance at one or more touch-sensing electrodes proximate to the input object. However, when an electrical grounding condition causes injection of the drive signal into the ground of an active stylus by way of a human hand, a positive change in capacitance may instead be observed at some touch-sensing electrodes proximate to the position of the human hand touch input. Thus, in some examples, the electrical grounding condition may be detected based at least in part on detecting a positive change in capacitance at one or more touch-sensing electrodes proximate to the position of the human hand touch input—e.g., a "hand-proximity-subset" of electrodes, as will be described in more detail below.

It will be understood that the above approaches to detecting an electrical grounding condition are non-limiting, and that an electrical grounding condition that interferes with a stylus's reception of a drive signal may be detected in any suitable way. Furthermore, it will be understood that the above approaches are not mutually-exclusive—e.g., the electrical grounding condition may be detected based on a combination of either or both of data reported by the active stylus, and signals measured at the touch-sensing electrodes of the touch-sensitive display device.

Returning briefly to FIG. 4, at 410, method 400 includes driving a hand-proximity-subset of touch-sensing electrodes with a second drive signal, different from the first drive signal. This may improve reception of the first drive signal by the active stylus, as will be described in more detail below. The "hand-proximity-subset" of touch-sensing electrodes may include any touch-sensing electrodes currently detecting proximity of the human hand, and may additionally include touch-sensing electrodes within a threshold distance of the position of the human hand touch input, where the threshold distance can have any suitable value depending on the implementation. Typically, the "hand-proximity-subset" may be distinguished from a "stylus-proximity-subset" of different touch-sensing electrodes that are within a threshold distance of the position of the stylus touch input. The two threshold distances, corresponding to the hand-proximity-subset and the stylus-proximity-subset, may beneficially be set such that the two subsets do not overlap—e.g., there are no touch-sensing electrodes that belong to both the hand-proximity-subset and the stylus-proximity-subset. Thus, in some cases, the threshold distances corresponding to the hand-proximity-subset and the stylus-proximity-subset may be set based on the relative positions of the stylus touch input and human hand touch input—e.g., the threshold distances may be relatively larger or smaller depending on the separation between the stylus touch input and human hand touch input. The threshold distances may be measured from the center of each touch input—e.g., from the center of the shape formed by the touch-sensing electrodes detecting proximity of an input object, from the edge of the shape formed by the electrodes, and/or from any other suitable point of reference.

Figure 7A:
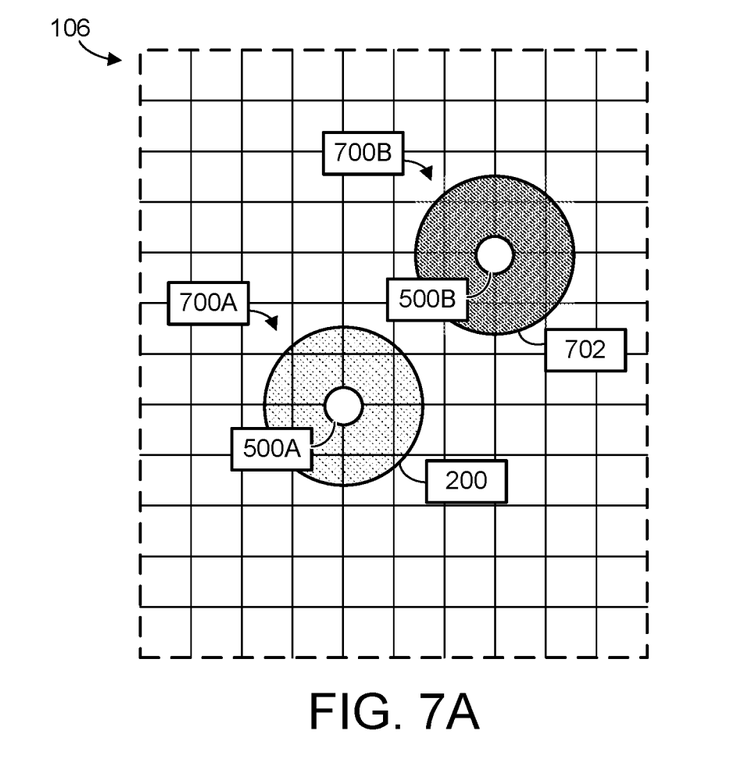
FIGS. 7A and 7B schematically illustrate driving subsets of touch-sensing electrodes with first and second drive signals.

This is illustrated with respect to FIG. 7A, which again shows a schematic representation of the plurality of touch-sensing electrodes 106. As shown, the touch-sensitive display device has identified a stylus-proximity-subset of electrodes 700A surrounding the position of the stylus touch input 500A, and a hand-proximity-subset of electrodes 700B surrounding the position of the human hand touch input 500B. In the example of FIG. 7A, the two subsets are represented by circles. It will be understood, however, that the electrodes included in each subset need not form a circular shape, but rather the electrodes selected for inclusion in each subset may form any suitable shape, including irregular shapes. For example, as discussed above, the portion of a human hand contacting a display surface while holding an active stylus may form an irregular "blob" shape. Thus, the hand-proximity-subset of electrodes driven with the second drive signal may include the same electrodes forming the blob shape, and may additionally include some number of electrodes extending beyond the edges of the blob.

Furthermore, in FIG. 7A, the two different subsets of electrodes are substantially the same size and shape. However, this is non-limiting. In practical examples, the hand-proximity-subset and stylus-proximity-subset may be different sizes and/or shapes. For example, in many cases, the human hand touch input may be relatively larger (e.g., caused by a relatively large portion of the human hand touching the display surface) than the stylus touch input, and thus the hand-proximity-subset of electrodes may be sized and/or shaped differently from the stylus-proximity-subset of electrodes.

The hand-proximity-subset and stylus-proximity-subset of electrodes may be distinguished in any suitable way. As described above with respect to FIG. 1, in some cases, the touch-sensitive display device may be configured to distinguish different types of input devices based on their electrical effects on the plurality of touch-sensing electrodes. For example, proximity of the human hand may passively change the measured capacitance at one or more touch-sensing electrodes, while the active stylus may actively transmit specific signals that allow the stylus touch input to be distinguished from the human hand touch input.

The hand-proximity-subset of electrodes may be driven with a second drive signal that differs from the first drive signal. This is indicated in FIG. 7A by the fill pattern shown for hand-proximity-subset 700B, indicating that the electrodes in the subset of electrodes is driven with a second drive signal 702. Notably, in some examples, after detecting the electrical grounding condition, the stylus-proximity-subset of touch-sensing electrodes (e.g., including electrodes of the plurality of touch-sensing electrodes within a threshold distance of the position of the stylus touch input) are driven with the first drive signal, while the hand-proximity-subset of touch-sensing electrodes are driven with the second drive signal. This is indicated in FIG. 7A by the different fill patterns used for the hand-proximity-subset and stylus-proximity-subset of touch-sensing electrodes. Specifically, the stylus-proximity-subset is shown with a lighter fill pattern to indicate that the electrodes are driven with the first drive signal 200. By contrast, the hand-proximity-subset is shown with a darker fill pattern to indicate that the electrodes are driven with the second drive signal 702.

Notably, in the example of FIG. 7A, the plurality of touch-sensing electrodes 106 includes touch-sensing electrodes not included in the hand-proximity-subset or the stylus-proximity-subset—e.g., any touch-sensing electrodes 106 shown outside of subsets 700A and 700B. In such cases, the touch-sensitive display device may refrain from driving the one or more touch-sensing electrodes not included in the hand-proximity-subset or the stylus-proximity-subset with the first drive signal or the second drive signal. For example, the touch-sensitive display device may conserve electrical power by only driving touch-sensing electrodes that are currently useful for communicating with the active stylus, while other electrodes may be connected to ground. It will be understood, however, that this is non-limiting. For instance, in another example, the stylus-proximity-subset of electrodes driven with the first drive signal may include any electrodes of the touch-sensitive display outside of the hand-proximity-subset—e.g., substantially all electrodes of the display may be driven with either the first drive signal or the second drive signal.

As discussed above, driving the hand-proximity-subset of electrodes with the second drive signal may improve reception of the first drive signal at the active stylus. For example, the electrical grounding condition discussed above may cause injection of the second drive signal into the electrical ground of the active stylus, even as the first drive signal enters the stylus via the stylus electrode. In the scenario described with respect to FIG. 3, where only one drive signal is used, the drive signal entering the stylus ground may reduce the potential for the same drive signal to enter the stylus tip—e.g., the grounding condition causes interference that reduces the amount of useable signal received at logic components of the active stylus. However, when two different drive signals are used, the second drive signal may serve to increase the potential for the first drive signal to enter the stylus tip, thereby improving communication between the touch-sensitive display device and active stylus.

Figure 7B:
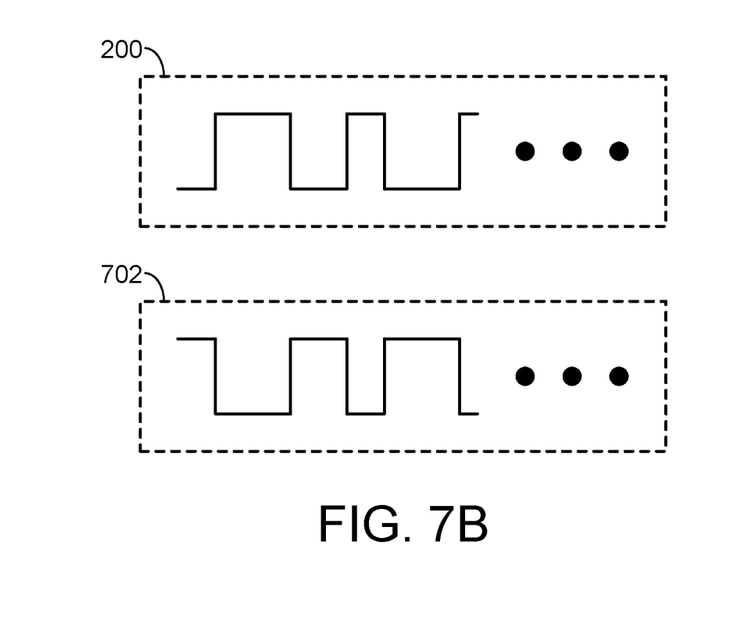

For example, the second drive signal may have an opposite phase from the first drive signal. This is illustrated with respect to FIG. 7B, which provides schematic representations of the first drive signal 200 and second drive signal 702 as a series of oscillating signal pulses, where the pulses may, for example, encode computer data to be communicated to the stylus. As shown, the second drive signal 702 has an opposite phase from the first drive signal. Thus, when the second drive signal is injected into stylus ground, the potential for the first drive signal to enter the stylus tip may be increased. In some cases, the effective strength of the first drive signal can be substantially doubled when the hand-proximity-subset of touch-sensing electrodes is driven with the second drive signal.

Notably, the electrical grounding condition may in some cases be a temporary condition that resolves based on electrical conditions of the touch-sensitive display device and/or active stylus changing. For example, a human user may pick up the touch-sensitive display device, begin touching the device with their other hand, plug the touch-sensitive display device into a power supply that is grounded to earth ground, etc. Thus, returning briefly to FIG. 4, at 412, method 400 optionally includes, based at least in part on detecting that the electrical grounding condition has been resolved, driving each of the plurality of touch-sensing electrodes with the first drive signal (e.g., as is shown in FIG. 6A). Detecting that the electrical grounding condition has been resolved may be done in any suitable way, similar to detecting the electrical grounding condition in the first place—e.g., by monitoring conditions at the touch-sensing electrodes, and/or receiving data from the active stylus. By again driving each of the plurality of touch-sensing electrodes with the first drive signal, the computational load on the touch-sensitive display device may be reduced—e.g., as it is no longer identifying separate subsets of touch-sensing electrodes and driving them with different signals. Furthermore, the latency of the device responding to new touch inputs (e.g., from a second active stylus) may be reduced, as it mitigates the risk that a new touch input may target a portion of the display where electrodes are not currently being driven by a drive signal.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 8:
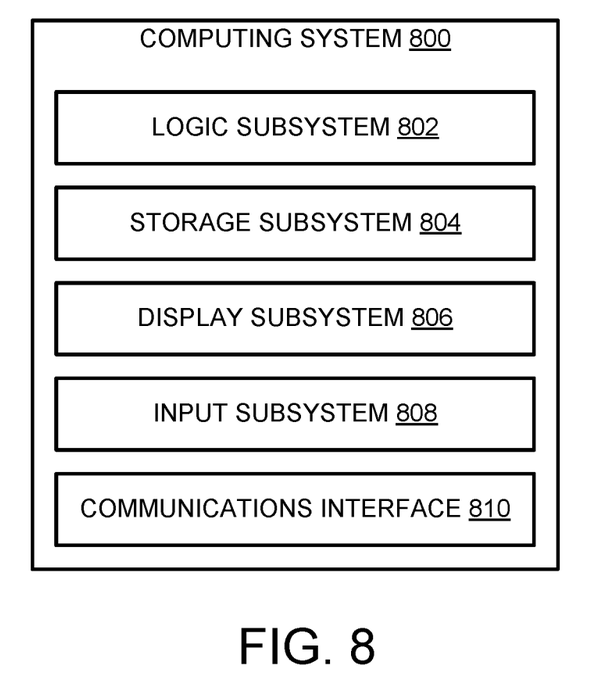
FIG. 8 schematically shows an example computing system.

FIG. 8 schematically shows a simplified representation of a computing system 800 configured to provide any to all of the compute functionality described herein. Computing system 800 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 800 includes a logic subsystem 802 and a storage subsystem 804. Computing system 800 may optionally include a display subsystem 806, input subsystem 808, communication subsystem 810, and/or other subsystems not shown in FIG. 8.

Logic subsystem 802 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 804 includes one or more physical devices configured to temporarily and/or permanently hold computer information such as data and instructions executable by the logic subsystem. When the storage subsystem includes two or more devices, the devices may be collocated and/or remotely located. Storage subsystem 804 may include volatile, nonvolatile, dynamic, static, read/write, read-only, random-access, sequential-access, location-addressable, file-addressable, and/or content-addressable devices. Storage subsystem 804 may include removable and/or built-in devices. When the logic subsystem executes instructions, the state of storage subsystem 804 may be transformed—e.g., to hold different data.

Aspects of logic subsystem 802 and storage subsystem 804 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 806 may be used to present a visual representation of data held by storage subsystem 804. This visual representation may take the form of a graphical user interface (GUI). Display subsystem 806 may include one or more display devices utilizing virtually any type of technology. In some implementations, display subsystem may include one or more virtual-, augmented-, or mixed reality displays.

When included, input subsystem 808 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 810 may be configured to communicatively couple computing system 800 with one or more other computing devices. Communication subsystem 810 may include wired and/or wireless communication devices compatible with one or more different communication protocols. The communication subsystem may be configured for communication via personal-, local- and/or wide-area networks.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method for a touch-sensitive display device comprises: detecting a position of a stylus touch input relative to a plurality of touch-sensing electrodes of the touch-sensitive display device, the stylus touch input corresponding to proximity of an active stylus to a display surface; detecting a position of a human hand touch input relative to the plurality of touch-sensing electrodes, the human hand touch input corresponding to proximity of a human hand to the display surface; driving each of the plurality of touch-sensing electrodes with a first drive signal to communicate data to the active stylus; detecting an electrical grounding condition that interferes with reception of the first drive signal by the active stylus; and driving a hand-proximity-subset of the plurality of touch-sensing electrodes within a threshold distance of the position of the human hand touch input with a second drive signal, different from the first drive signal. In this example or any other example, the second drive signal has an opposite phase from the first drive signal. In this example or any other example, after detecting the electrical grounding condition, a stylus-proximity-subset of touch-sensing electrodes of the plurality of touch-sensing electrodes within a threshold distance of the position of the stylus touch input are driven with the first drive signal, while the hand-proximity-subset of touch-sensing electrodes are driven with the second drive signal. In this example or any other example, the plurality of touch-sensing electrodes includes one or more touch-sensing electrodes not included in the hand-proximity-subset or the stylus-proximity-subset. In this example or any other example, the method further comprises refraining from driving the one or more touch-sensing electrodes not included in the hand-proximity-subset or the stylus-proximity-subset with the first drive signal or the second drive signal. In this example or any other example, the electrical grounding condition is detected based at least in part on detecting a positive change in capacitance at one or more touch-sensing electrodes of the hand-proximity-subset. In this example or any other example, the electrical grounding condition is detected based at least in part on receiving, from the active stylus, an indication of insufficient reception of the first drive signal. In this example or any other example, the method further comprises, based at least in part on detecting that the electrical grounding condition has been resolved, driving each of the plurality of touch-sensing electrodes with the first drive signal. In this example or any other example, the plurality of touch-sensing electrodes includes all touch-sensing electrodes of the touch-sensitive display device.

In an example, a touch-sensitive display device comprises: a touch-sensitive display including a plurality of touch-sensing electrodes; a logic subsystem; and a storage subsystem holding instructions executable by the logic subsystem to: detect a position of a stylus touch input relative to the plurality of touch-sensing electrodes, the stylus touch input corresponding to proximity of an active stylus to a surface of the touch-sensitive display; detect a position of a human hand touch input relative to the plurality of touch-sensing electrodes, the human hand touch input corresponding to proximity of a human hand to the surface of the touch-sensitive display; drive each of the plurality of touch-sensing electrodes with a first drive signal to communicate data to the active stylus; detect an electrical grounding condition that interferes with reception of the first drive signal by the active stylus; and drive a hand-proximity-subset of the plurality of touch-sensing electrodes within a threshold distance of the position of the human hand touch input with a second drive signal, different from the first drive signal. In this example or any other example, the second drive signal has an opposite phase from the first drive signal. In this example or any other example, after detecting the electrical grounding condition, a stylus-proximity-subset of touch-sensing electrodes of the plurality of touch-sensing electrodes within a threshold distance of the position of the stylus touch input are driven with the first drive signal, while the hand-proximity-subset of touch-sensing electrodes are driven with the second drive signal. In this example or any other example, the plurality of touch-sensing electrodes includes one or more touch-sensing electrodes not included in the hand-proximity-subset or the stylus-proximity-subset. In this example or any other example, the instructions are further executable to refrain from driving the one or more touch-sensing electrodes not included in the hand-proximity-subset or the stylus-proximity-subset with the first drive signal or the second drive signal. In this example or any other example, the electrical grounding condition is detected based at least in part on detecting a positive change in capacitance at one or more touch-sensing electrodes of the hand-proximity-subset. In this example or any other example, the electrical grounding condition is detected based at least in part on receiving, from the active stylus, an indication of insufficient reception of the first drive signal. In this example or any other example, the instructions are further executable to, based at least in part on detecting that the electrical grounding condition has been resolved, drive each of the plurality of touch-sensing electrodes with the first drive signal. In this example or any other example, the plurality of touch-sensing electrodes includes all touch-sensing electrodes of the touch-sensitive display device.

In an example, a method for a touch-sensitive display device comprises: detecting a position of a stylus touch input relative to a plurality of touch-sensing electrodes of the touch-sensitive display device, the stylus touch input corresponding to proximity of an active stylus to a display surface; detecting a position of a human hand touch input relative to the plurality of touch-sensing electrodes, the human hand touch input corresponding to proximity of a human hand to the display surface; driving each of the plurality of touch-sensing electrodes with a first drive signal to communicate data to the active stylus; detecting an electrical grounding condition that interferes with reception of the first drive signal by the active stylus; driving a stylus-proximity-subset of touch-sensing electrodes of the plurality of touch-sensing electrodes within a threshold distance of the position of the stylus touch input with the first drive signal; and driving a hand-proximity-subset of the plurality of touch-sensing electrodes within a threshold distance of the position of the human hand touch input with a second drive signal, having an opposite phase from the first drive signal. In this example or any other example, the plurality of touch-sensing electrodes includes one or more touch-sensing electrodes not included in the hand-proximity-subset or the stylus-proximity-subset, and the method further comprises refraining from driving the one or more touch-sensing electrodes not included in the hand-proximity-subset or the stylus-proximity-subset with the first drive signal or the second drive signal.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for a touch-sensitive display device, the method comprising:
   detecting a position of a stylus touch input relative to a plurality of touch-sensing electrodes of the touch-sensitive display device, the stylus touch input corresponding to proximity of an active stylus to a display surface, wherein the plurality of touch-sensing electrodes includes all touch-sensing electrodes of the touch-sensitive display device;
   detecting a position of a human hand touch input relative to the plurality of touch-sensing electrodes, the human hand touch input corresponding to proximity of a human hand to the display surface;
   driving each of the plurality of touch-sensing electrodes with a first drive signal to communicate data to the active stylus;
   detecting an electrical grounding condition that interferes with reception of the first drive signal by the active stylus; and
   driving a hand-proximity-subset of the plurality of touch-sensing electrodes within a threshold distance of the position of the human hand touch input with a second drive signal, different from the first drive signal, where the second drive signal is not used on any touch-sensing electrodes of the touch-sensitive display device other than the hand-proximity-subset, and wherein all of the plurality of touch-sensing electrodes other than the hand-proximity-subset of touch-sensing electrodes are driven with the first drive signal while the hand-proximity-subset of touch-sensing electrodes are driven with the second drive signal.

2. The method of claim 1, wherein the second drive signal has an opposite phase from the first drive signal.

3. The method of claim 1, wherein the electrical grounding condition is detected based at least in part on detecting a positive change in capacitance at one or more touch-sensing electrodes of the plurality of touch-sensing electrodes.

4. The method of claim 1, wherein the electrical grounding condition is detected based at least in part on receiving, from the active stylus, an indication of insufficient reception of the first drive signal.

5. The method of claim 1, further comprising, based at least in part on detecting that the electrical grounding condition has been resolved, driving each of the plurality of touch-sensing electrodes with the first drive signal.

6. A touch-sensitive display device, comprising:
   a touch-sensitive display including a plurality of touch-sensing electrodes;
   a logic subsystem; and
   a storage subsystem holding instructions executable by the logic subsystem to:
     detect a position of a stylus touch input relative to the plurality of touch-sensing electrodes, the stylus touch input corresponding to proximity of an active stylus to a surface of the touch-sensitive display, wherein the plurality of touch-sensing electrodes includes all touch-sensing electrodes of the touch-sensitive display device;
     detect a position of a human hand touch input relative to the plurality of touch-sensing electrodes, the human hand touch input corresponding to proximity of a human hand to the surface of the touch-sensitive display;
     drive each of the plurality of touch-sensing electrodes with a first drive signal to communicate data to the active stylus;
     detect an electrical grounding condition that interferes with reception of the first drive signal by the active stylus; and
     drive a hand-proximity-subset of the plurality of touch-sensing electrodes within a threshold distance of the position of the human hand touch input with a second drive signal, different from the first drive signal, where the second drive signal is not used on any touch-sensing electrodes of the touch-sensitive display device other than the hand-proximity-subset, and wherein all of the plurality of touch-sensing electrodes other than the hand-proximity-subset of touch-sensing electrodes are driven with the first drive signal while the hand-proximity-subset of touch-sensing electrodes are driven with the second drive signal.

7. The touch-sensitive display device of claim 6, wherein the second drive signal has an opposite phase from the first drive signal.

8. The touch-sensitive display device of claim 6, wherein the electrical grounding condition is detected based at least in part on detecting a positive change in capacitance at one or more touch-sensing electrodes of the plurality of touch-sensing electrodes.

9. The touch-sensitive display device of claim 6, wherein the electrical grounding condition is detected based at least in part on receiving, from the active stylus, an indication of insufficient reception of the first drive signal.

10. The touch-sensitive display device of claim 6, wherein the instructions are further executable to, based at least in part on detecting that the electrical grounding condition has been resolved, drive each of the plurality of touch-sensing electrodes with the first drive signal.

11. A method for a touch-sensitive display device, the method comprising:
- detecting a position of a stylus touch input relative to a plurality of touch-sensing electrodes of the touch-sensitive display device, the stylus touch input corresponding to proximity of an active stylus to a display surface, wherein the plurality of touch-sensing electrodes includes all touch-sensing electrodes of the touch-sensitive display device;
- detecting a position of a human hand touch input relative to the plurality of touch-sensing electrodes, the human hand touch input corresponding to proximity of a human hand to the display surface;
- driving each of the plurality of touch-sensing electrodes with a first drive signal to communicate data to the active stylus;
- detecting an electrical grounding condition that interferes with reception of the first drive signal by the active stylus;
- driving a stylus-proximity-subset of touch-sensing electrodes of the plurality of touch-sensing electrodes within a threshold distance of the position of the stylus touch input with the first drive signal; and
- driving a hand-proximity-subset of the plurality of touch-sensing electrodes within a threshold distance of the position of the human hand touch input with a second drive signal, having an opposite phase from the first drive signal, where the second drive signal is not used on any touch-sensing electrodes of the touch-sensitive display device other than the hand-proximity-subset, and wherein all of the plurality of touch-sensing electrodes other than the hand-proximity subset of touch-sensing electrodes are driven with the first drive signal while the hand-proximity-subset of touch-sensing electrodes are driven with the second drive signal.

* * * * *